(12) United States Patent
Glaser et al.

(10) Patent No.: US 8,903,943 B2
(45) Date of Patent: Dec. 2, 2014

(54) INTEGRATING CLOUD APPLICATIONS AND REMOTE JOBS

(75) Inventors: Scott Glaser, Dublin, CA (US); Nitin Patlola, Fremont, CA (US); Poonguzhali Balasubramanian, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 326 days.

(21) Appl. No.: 13/210,208

(22) Filed: Aug. 15, 2011

(65) Prior Publication Data

US 2012/0209947 A1    Aug. 16, 2012

Related U.S. Application Data

(60) Provisional application No. 61/443,136, filed on Feb. 15, 2011.

(51) Int. Cl.
*G06F 15/16* (2006.01)
*G06F 9/50* (2006.01)

(52) U.S. Cl.
CPC .................................. *G06F 9/5027* (2013.01)
USPC ........................................................ 709/217

(58) Field of Classification Search
USPC ................................................. 709/217, 224
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Hee Soo Kim
(74) *Attorney, Agent, or Firm* — Weaver Austin Villeneuve & Sampson LLP

(57) ABSTRACT

Disclosed herein are techniques for integrating cloud applications and remote jobs. In some implementations, a request to initiate a remote execution procedure may be received at a first computing system. The first computing system may be controlled by a first entity and may be configured to provide on-demand computing services to a plurality of entities including a second entity. The remote execution procedure may include an instruction to perform a remote computing task capable of being performed by a second computing system. A request message may be transmitted from the first computing system to the second computing system, which may be controlled by the second entity. The request message may include an instruction to perform the remote computing task. A response message indicating a result of performing the remote computing task may be received from the second computing system.

27 Claims, 10 Drawing Sheets

(56) References Cited

U.S. PATENT DOCUMENTS

| | | |
|---|---|---|
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,181,758 B1 | 2/2007 | Chan |
| 7,269,590 B2 | 9/2007 | Hull et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,827,208 B2 | 11/2010 | Bosworth et al. |
| 7,853,881 B1 | 12/2010 | Assal et al. |
| 7,945,653 B2 | 5/2011 | Zukerberg et al. |
| 8,005,896 B2 | 8/2011 | Cheah |
| 8,015,495 B2 | 9/2011 | Achacoso et al. |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2011/0238458 A1* | 9/2011 | Purcell et al. ................ 705/7.27 |
| 2012/0290407 A1 | 11/2012 | Hubbard et al. |
| 2013/0212497 A1 | 8/2013 | Zelenko et al. |

* cited by examiner

INTEGRATING CLOUD APPLICATIONS AND REMOTE JOBS

PRIORITY AND RELATED APPLICATION DATA

This application claims priority to Provisional U.S. Patent App. No. 61/443,136, filed on Feb. 15, 2011, entitled "Integrating Cloud Applications and Remote Jobs," by Glaser et al., which is incorporated herein by reference in its entirety and for all purposes.

TECHNICAL FIELD

The present disclosure relates generally to on-demand services provided over a data network such as the Internet, and more specifically to the execution of remote computing tasks.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process steps for the disclosed techniques for integrating on-demand applications and remote jobs. These drawings in no way limit any changes in form and detail that may be made to implementations by one skilled in the art without departing from the spirit and scope of the disclosure.

DETAILED DESCRIPTION

Figure 1:
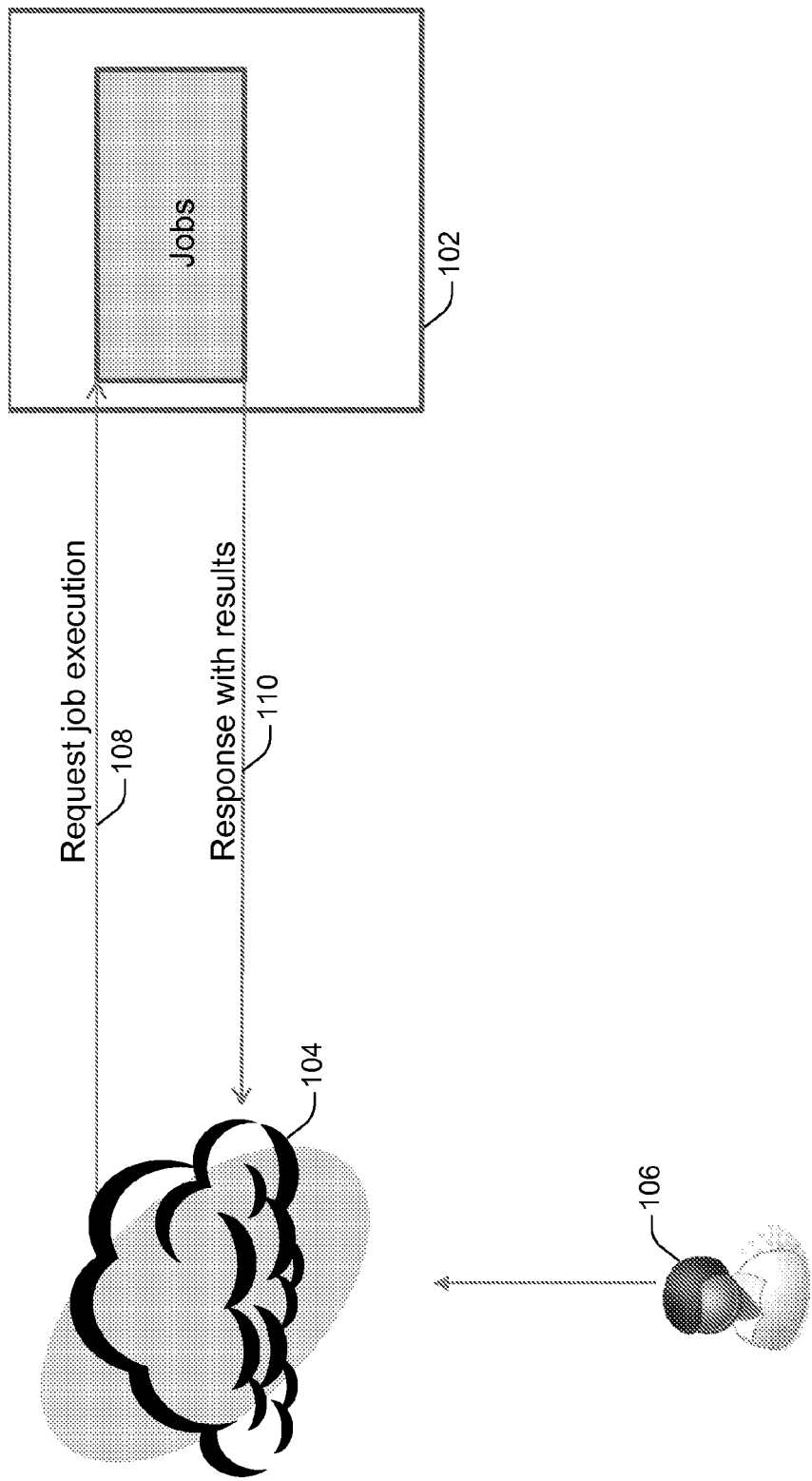
FIG. 1 shows a system diagram of a system 100 for integrating on-demand applications and remote jobs, provided in accordance with one implementation.

Applications of systems and methods according to one or more implementations are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosure, it is understood that these examples are not limiting, such that other implementations may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The disclosed implementations provide for configuring and executing remote execution procedures in an on-demand computing services environment. The remote execution procedures may include computing tasks configured to be executed locally within the on-demand computing services environment. The remote execution procedures may also include computing tasks configured to be executed remotely at computing systems located outside at least a portion of the on-demand computing services environment.

In some implementations, techniques described herein may facilitate the integration of computing services provided via an on-demand computing services environment with computing services provided via a different environment. The on-demand computing services environment may be controlled by a service provider and may be configured to provide on-demand computing services to a plurality of entities. A remote execution procedure may be configured and performed at least in part at the on-demand computing services environment. The remote execution procedure may include at least one computing task configured to be performed at a remote computing system physically or logically separate from the portion of the on-demand computing environment in which the remote execution procedure is initiated.

In some implementations, performing the remote execution procedure may include transmitting a request message to a remote system. The request message may identify a remote computing task to perform at the remote computing system. The on-demand computing services environment may then receive a response message from the remote system. The response message may indicate a result of performing the remote computing task.

In some implementations, a remote execution procedure may be configured to perform one or more of a variety of different computing tasks. For example, the remote execution procedure may be configured to test a remote or cloud-based application. As another example, the remote execution procedure may be configured to deploy to the cloud an application developed on a remote system. As yet another example, the remote execution procedure may be configured to facilitate the integration of operations performed on the cloud with operations performed on a remote system to create a seamless, cross-platform application.

In some implementations, a remote execution procedure may be configured to facilitate integration of services provided via a cloud infrastructure and services provided via a remote system. For instance, an entity may run its sales operations from a cloud application and its purchasing infrastructure on its own, on-premises infrastructure. These systems may be provided by various types of software running on various types of hardware infrastructures. In this case, the sales application running on the cloud infrastructure may transmit a request, such as a request for credit card validation, to the on-premises system and receive a response, such as approval or disapproval of the request.

In some implementations, a remote execution procedure may be employed by a user of cloud computing services to perform computing tasks on the computing premises of the user. In this way, the user may perform their entity operations via a single system. The cloud computing services may include on-demand computing services provided via a network. The on-demand computing services may be provided via a multitenant environment, which may employ a multitenant database system. The user may be one of the tenants of the multitenant environment.

In some implementations, an entity's data may span various environments such as a cloud infrastructure, an on-premises computing environment, and backend or remote systems. By managing and initiating remote execution procedures from the cloud, the entity may be able to coordinate access to this disparate data. For instance, a workflow performed on the cloud may require access to data stored on a backend system accessible via an entity's on-premises infrastructure. The remote execution procedure initiated in the cloud may be configured to retrieve this data from the backend system by way of the entity's on-premises infrastructure.

In some implementations, initiating a remote execution procedure from the cloud may provide a single point of execution. Data resulting from the remote execution procedure may be stored in the cloud and used for analysis or subsequent actions. For example, test data from remote execution procedure testing may be stored in the cloud and viewable as trends over time. As another example, results from services integration queries transmitted to remote systems may be stored for financial analysis. The data may be made available to users associated with the entity, users associated with the service provider (e.g., account representatives), or users associated with third parties (e.g., consultants, analysts, etc.).

In some implementations, a remote execution procedure may be used to facilitate the deployment of software developed on these remote systems to the entity's production environment. For instance, an entity may access tested and deployed applications on a "production" environment provided via an on-demand computing services environment. In order to maintain the integrity of the services and data accessible via the production environment, the entity may develop and test applications in one or more environments external to the production environment. These external environments may be located on the entity's premises, on other logically separate portions of the on-demand computing services environment, or on third party systems. A remote execution procedure initiated on the on-demand services environment may transmit a request to a remote system used to develop cloud computing applications. Upon receiving the request, the remote system may perform operations such as initiating pre-deployment tests, determining a result of a pre-deployment test, and transmitting application code to the on-demand services environment for deployment.

In some implementations, a remote execution procedure may be used to facilitate the testing of software developed on a remote system. In one example, an entity may have access to a test system (e.g., Selenium) at a remote system. In another example, the entity may develop and test a cloud-based application on a cloud infrastructure simulated at the remote system. For instance, development and testing of a cloud-based application may be facilitated by a plugin to the Eclipse development environment. In yet another example, an entity may wish to test a cloud application against data that is stored in a manner accessible to the remote system but not directly accessible to the cloud. A remote execution procedure may include operations for performing any or all of the above-mentioned testing operations, as well as other types of testing operations. For example, a remote execution procedure may include a message transmitted from the on-demand computing services environment to the remote system to cause the remote system to initiate a test procedure local to the remote system that uses data local to the remote system. As another example, a remote execution procedure may test an application that runs in part on the on-demand computing services environment using cloud-accessible data and in part on the remote system using data accessible to the remote system.

In some implementations, a remote execution procedure may combine testing and deployment operations. For instance, a remote execution procedure may include operations for deploying an application developed on a remote system to the on-demand computing services environment. Then, the remote execution procedure may test the deployed application using test data or test procedures in the on-demand computing services environment. If a test failure is detected, the application may be rolled back to a previous version that did not fail the test. Then, a developer may be informed of the test failure so that the error can be fixed.

In some implementations, a remote execution procedure may be used to coordinate remote computing tasks among two or more remote systems. For instance, an entity may employ one on-premises system for development and another on-premises system for production, and the production system may implement applications that coordinate with applications provided via the on-demand computing services environment. In this case, a remote execution procedure may be configured to test software at the development system, deploy software to the production system, and test the interaction between the deployed software and the cloud-based services provided by the service provider.

In some implementations, a remote execution procedure may be used to execute remote tests of an application running in a cloud computing environment. For instance, an entity accessing services via an on-demand computing services environment may test these services via tests running at the entity's premises or at another location controlled by the entity. These tests may serve to determine whether the services running in the cloud are functioning properly. The tests may use a combination of data stored in the cloud, data stored on the entity's premises, and data stored at another network-accessible location. Various users may wish to initiate these tests.

In one example, the service provider of the cloud computing environment may wish to initiate the entity's tests. For instance, the service provider may be upgrading the infrastructure of the cloud computing environment and may wish to ensure that the entities own test results do not change as a result of the upgrade. In this case, a remote execution procedure initiated in the cloud computing environment may be used to execute the entity's own tests. Then, the results may be compared against previous test results to determine whether the upgrade of the service environment caused any unexpected consequences. Thus, a remote execution procedure may include one or more operations configured for the performance of regression testing.

In another example, the entity may wish to initiate test results from a centralized, convenient location in the cloud. In this way, users associated with the entity may view past and present test results in a dashboard interface accessible via a network such as the Internet. Further, the entity's own tests running at the entity's premises may be integrated with tests running in the cloud computing environment.

The preceding examples describe only a few examples of the types of operations that may be performed via a remote execution procedure according to some implementations. A remote execution procedure may be configured to include various instructions that may be executed, and a developer of the remote execution procedure may specify any type of operation supported by the remote execution procedure framework to include within a given remote execution procedure. These operations may include test operations, deployment operations, enterprise integration operations, or any other types of operations. Further, the operations may be performed the on-demand computing services environment, at the entity's premises, at a backend system accessible to the entity, at a third party system accessible by the entity or the on-demand computing services provider, or at any other network-accessible computing system location. Additionally, the data operated upon by the operations within the remote execution procedure may be located at the on-demand computing services environment, at the entity's premises, at a backend system accessible to the entity, at a third party system accessible by the entity or the on-demand computing services provider, or at any other network-accessible storage location.

In some implementations, the configuring and initiation of remote execution procedures may allow entities to avoid slow, manual execution of performance tasks. For instance, rather than manually committing software development code changes to a repository, manually performing a test, and manually deploying the code to the cloud application if the test is successful, these operations may be performed automatically from the cloud.

In some implementations, the configuration an initiation of cloud-based remote execution procedures may allow integration of services provided via different computing platforms without requiring the installation of proprietary software on the various systems. Instead, remote systems may need only to have the capability of exposing computing tasks to a network-accessible interface (e.g., HTTP) to be able to integrate with the cloud infrastructure via cloud-based remote execution procedures.

In some implementations, providing the capability of configuring and performing a remote execution procedure may provide clients, entities, affiliates, and users of a cloud application with the ability to execute computing tasks on a remote computing system located outside of the cloud. When such tasks are executed, rapid feedback may be provided. Further, providing a framework for configuring and performing a remote execution procedure may allow the integration of a cloud computing system with supporting and related computing systems such as development, testing, continuous integration, and enterprise integration environments. Also, providing a remote execution procedure framework may facilitate the execution of downstream processes in which a cloud computing application is part of a larger integration flow or workflow. Additionally, a remote execution procedure may leverage cloud computing features such as cloud-based storage and reports for computing task execution results and trends.

FIG. 1 shows a system diagram of a system 100 for integrating on-demand applications and remote jobs, provided in accordance with one implementation. FIG. 1 includes a remote system 102, an on-demand computing services environment 104, a user 106, a request message 108, and a response message 110.

In some implementations, the system 100 shown in FIG. 1 may be used to configure and execute a remote execution procedure. The remote execution procedure may include various types of computing tasks. Some of these computing tasks may be performed at the on-demand computing services environment 104, while others of the computing tasks may be performed at the remote system 102.

In some implementations, the on-demand computing services environment 104 may be any system configured to provide on-demand computing services to a plurality of entities. Such services may also be referred to as "cloud computing" services. Techniques for providing cloud computing services are discussed in additional detail with respect to FIGS. 8A-10.

In some implementations, on-demand services may be at least partially integrated with computing tasks performed at a remote system, such as the remote system 102. For example, the remote system 102 may represent a computing environment controlled by an entity accessing the on-demand computing services environment 104. As another example, the remote system 102 may represent a third party system configured to provide services complementary to those provided by the on-demand computing services environment 104. As yet another example, the remote system 102 may represent a portion of an on-demand computing services environment that is logically and/or physically separate from the on-demand computing services environment 104.

In some implementations, the remote system 102 and/or the on-demand computing services environment 104 may include at least one subsystem configured to schedule and initiate a computing task in response to a request received via a network or via a local system. For example, either or both systems may include Apache® Tomcat® server software available from the Apache Software Foundation having a place of operation in Forest Hill, Maryland. As another example, either or both systems may include Hudson® server software available from Oracle®, Inc. having a place of operation in Redwood Shores, California. As yet another example, either or both systems may include Jenkins server software released under the open source MIT License. In some cases, this subsystem need not be custom created by the service provider. Rather, any tool operable to receive a request message to perform computing tasks, initiate the requested computing tasks, and transmit a response message may be used. Alternately, or additionally, the subsystem may be provided at least in part by the service provider.

In some implementations, the remote system 102 and/or the on-demand computing services environment 104 may be configured to operate in accordance with Representational State Transfer (REST) principles. In a REST-style architecture, computing systems can receive requests and return appropriate responses. Requests and responses are built around the transfer of representations of resources. A resource can include any coherent and meaningful concept that may be addressed and that is supported by the system. The RESTful model may be used to provide access to computing services that may be initiated or otherwise contacted upon request over a network.

In some implementations, the remote system 102 may include a subsystem for facilitating development of an on-demand computing application. The subsystem may include a copy or a local representation of at least a portion of the on-demand computing services environment. For instance, the subsystem may include a plugin to the Eclipse® development environment available from Oracle®, Inc.

In some implementations, the user 106 may configure or initiate a remote execution procedure at the on-demand computing services environment 104. The user 106 may be any user with permission to access the on-demand computing services environment 104 via a network. For example, the user 106 may be associated with the service provider that controls the on-demand computing services environment 104. As another example, the user 106 may be associated with the entity that controls the remote system 102. As yet another example, the user 106 may be associated with a third party entity such as an entity that provides services that complement those provided via the on-demand computing services environment 104.

In some implementations, the user 106 may represent a computing program, such as a task initiation program. The computing program may transmit a request to the on-demand computing services environment 104 periodically, at scheduled times, upon detection of an event, or according to any other schema.

In some implementations, the user may transmit a request to the on-demand computing services environment 104 to initiate a remote execution procedure. After the on-demand computing services environment 104 receives the request to initiate the remote execution procedure, the on-demand computing services environment 104 may perform the operations specified by the remote execution procedure. The remote execution procedure may include at least one computing task capable of being performed on a remote system.

In some implementations, the on-demand computing services environment 104 may transmit a request message 108 to the remote system 102 to perform a remote computing task. The remote computing task may be any task capable of being performed by the remote system 102. For example, a remote computing task may include a test procedure for testing data, source code, compiled programs, or any other testable feature within a computing environment. As another example, a remote computing task may include a build procedure configured to perform operations related to creating a build of a program or system, such as compiling source code. As yet another example, a remote computing task may include a deployment procedure configured to deploy a program or system.

In some implementations, the remote system 102 may transmit a response message 110 to the on-demand computing services environment 104. The response message 110 may include various types of information, such as information related to the performance of the remote computing task. For example, the response message 110 may indicate that the remote computing task is complete. As another example, the response message 110 may indicate a result or execution status of the remote computing task.

In some implementations, the request message 108 and the response message 110 may be transmitted via a designated communication protocol such as HTTP over a network such as the Internet. The messages may be transmitted in accordance with a designated message format such as JSON or XML. The messages may be created and processed in accordance with a designated message passing protocol such as REST. Alternately, or additionally, other communication protocols, message formats, and message passing protocols may be used. Further, the communication protocols, message formats, and message passing protocols used in conjunction with the request message 108 may be the same or different than the protocols and formats used in conjunction with the response message 110.

Figure 2:
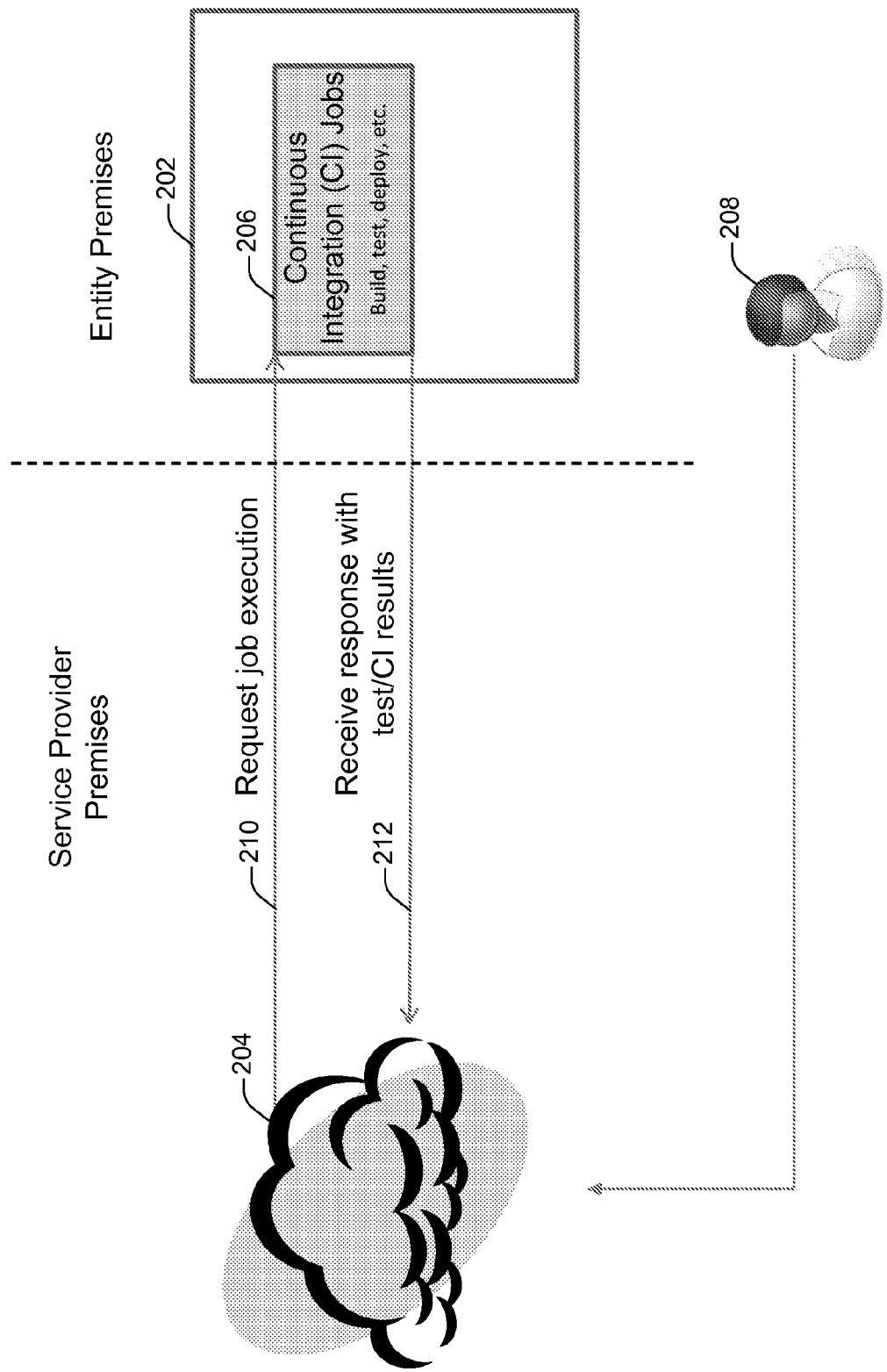
FIG. 2 shows a system diagram of a system 200 for integrating on-demand applications and continuous integration jobs located on entity premises, provided in accordance with one implementation.

FIG. 2 shows a system diagram of a system 200 for integrating on-demand applications and continuous integration jobs located on entity premises, provided in accordance with one implementation. The system 200 includes a remote system 202, an on-demand computing services environment 204, remote computing tasks 206, a user 208, a request message 210, and a response message 212.

In some implementations, the on-demand computing services environment 204 may be substantially similar to the on-demand computing services environment 104 discussed with respect to FIG. 1.

In some implementations, the remote system 202 at which the remote computing task is performed may be located at the premises of an entity in communication with the on-demand computing services environment 204. For example, the entity may be receiving services provided via the on-demand computing services environment 204. As another example, the entity may be an affiliate of the service provider and may be providing services to other entities via the on-demand computing services environment 204. The remote system 202 may be physically located at the premises of the entity or may be located elsewhere and controlled by the entity via a network.

In some implementations, the remote computing task performed at the remote system 202 may include tasks related to software engineering practices, such as the continuous integration jobs 206. In many cases, software deployed in the on-demand computing services environment 204 may be developed on the entity premises in the remote system 202. In software engineering, continuous integration may involve frequent or continuous processes of applying quality control to software. The continuous integration jobs 206 may include operations for building, testing, or deploying software developed on the remote system 202 for use in the on-demand computing services environment 204. For instance, the continuous integration jobs 206 may include, but are not limited to: compiling computing programming language code, linking compiled code, executing code, testing code using test procedures, testing code using test data, and transmitting code to the on-demand computing services environment 204.

In some implementations, by facilitating the initiation of such tasks from the on-demand computing services environment 204, the development of cloud computing software may be integrated more tightly with the execution of such software in the cloud. Further, cloud computing software may be built, tested, and deployed more frequently. In some instances, such practices may improve the quality of cloud computing software and reduce the time taken to deliver it by replacing traditional practices in which quality control is applied after completing all or much of the software development process.

In some implementations, the user 208 may transmit a request to the on-demand computing services environment 204 to initiate the remote execution procedure. As discussed with respect to the user 106 shown in FIG. 1, various users may configure or initiate the remote execution procedure. For instance, as shown in FIG. 2, the user may be located at the entity premises. In this situation, the user may be a developer or system administrator associated with the entity. The on-demand computing services environment 204 may take steps to verify that the user 208 has permission to initiate the remote execution procedure.

In some implementations, the on-demand computing services environment 204 may transmit a request message 210 in the process of performing the remote execution procedure. The request message 210 may include any information necessary for causing a remote computing task to be initiated on the remote system 202. For instance, the request message 210 may identify a remote computing task, specify parameters for initiating the remote computing task, identify data to be included in the response message 212, or include any other information.

In some implementations, more than one request message 210 may be transmitted from the on-demand computing services environment 204 to the remote system 202. For instance, the remote execution procedure may include a request to perform a continuous integration computing task, such as building and testing a software program. Then, based on the result of that computing task, the on-demand computing services environment 204 may transmit another request to perform a continuous integration computing task, such as deploying the software program to the on-demand computing services environment 204.

In some implementations, the remote system 202 may transmit a response message 212 back to the on-demand computing services environment 204. The response message 212 may be transmitted when the remote computing task is complete, when the remote computing task is initiated, or at any other time. The response message 212 may include any type of information relevant to the performance of the remote computing task. For instance, the response message 212 may indicate a result of an attempt to build, test, or deploy a software program.

Figure 3:
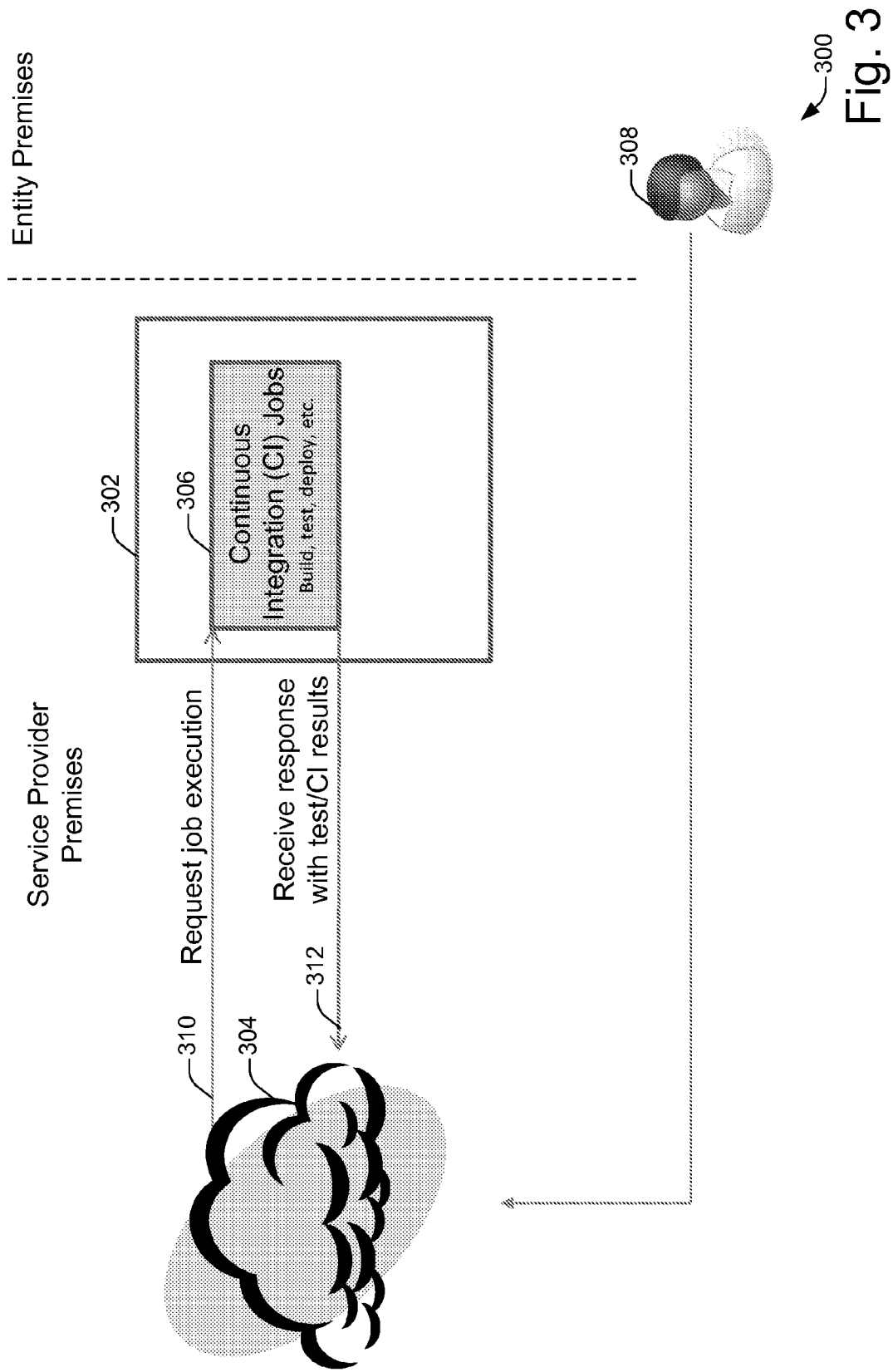
FIG. 3 shows a system diagram of a system 300 for integrating on-demand applications and continuous integration jobs located elsewhere in an on-demand computing services environment, provided in accordance with one implementation.

FIG. 3 shows a system diagram of a system 300 for integrating on-demand applications and continuous integration jobs located elsewhere in an on-demand computing services environment, provided in accordance with one implementation. The system 300 includes a remote system 302, an on-demand computing services environment 304, remote computing tasks 306, a user 308, a request message 310, and a request message 312.

In some implementations, the elements 302-312 shown in FIG. 3 may be substantially similar to the comparable elements 202-212 shown in FIG. 2. Accordingly, FIG. 3 is described herein primarily with respect to the ways in which it differs from FIG. 2.

In some implementations, the remote system 302 may be located on the service provider premises. For instance, an on-demand computing services environment may be logically divided into different systems. Then, different entities accessing the on-demand computing services environment 310 may each be presented with a different instance of a computing environment. Each instance of the computing environment may include different types of computing resources, which may be enabled or disabled for each instances. As well, each instance of the computing environment may be associated with data that is accessible via that instance. In this way, the computing resources associated with the on-demand computing services environment 310 may be shared between different entities. At the same time, the security and integrity of data associated with different entities accessing the on-demand computing services environment 310 may be maintained.

In some implementations, as shown in FIG. 3, the on-demand computing services environment 310 and the remote system 302 may be different logical divisions of the same system. For example, the on-demand computing services environment 310 may be a production system for providing services, and the remote system 302 may be a development system for developing the services. As another example, the on-demand computing services environment 310 may represent one logical computing environment controlled by one entity accessing on-demand computing services, and the remote system 302 may represent another logical computing environment controlled by a different entity accessing on-demand computing services. As yet another example, the on-demand computing services environment 310 and the remote system 302 may represent logical computing environments within the cloud that are controlled by different departments or segments of the same entity.

In some implementations, the remote system may include one or more mobile devices. As companies move into developing platform-specific software applications, testing them is increasingly difficult. Software applications may be run in part over a network such as the Internet and may be run on a variety of devices that vary in both hardware and software. These differences may result in significant variations of application behavior between different hardware and/or software platforms. For example, variations between devices may result in differences based on factors such as the brand and model of hardware device, the operating system installed on the device, the screen resolution of the device, and the internal capabilities of the mobile browser installed on the device. To facilitate cross-platform device testing, in some implementations, a custom "test runner" application may be run on a device. The test runner application can behave much like a thin client. The test runner may be configured to receive and implement test requests from a test server. The test runner may be configured to perform actions and retrieve parameters at a mobile device. The test runner application may include supporting code configured to embed and/or manipulate a web view. The test runner application may be accessed via communications transmitted from the on-demand computing services environment 304, via communications transmitted from the remote system 302, or via some combination thereof. Techniques for testing mobile devices are discussed in additional detail in co-pending and commonly assigned U.S. patent application Ser. No. 13/104,784, entitled "Automated Testing on Mobile Devices", by Jason A. Schroeder, filed on May 10, 2011, which is incorporated herein in its entirety and for all purposes.

Figure 4:
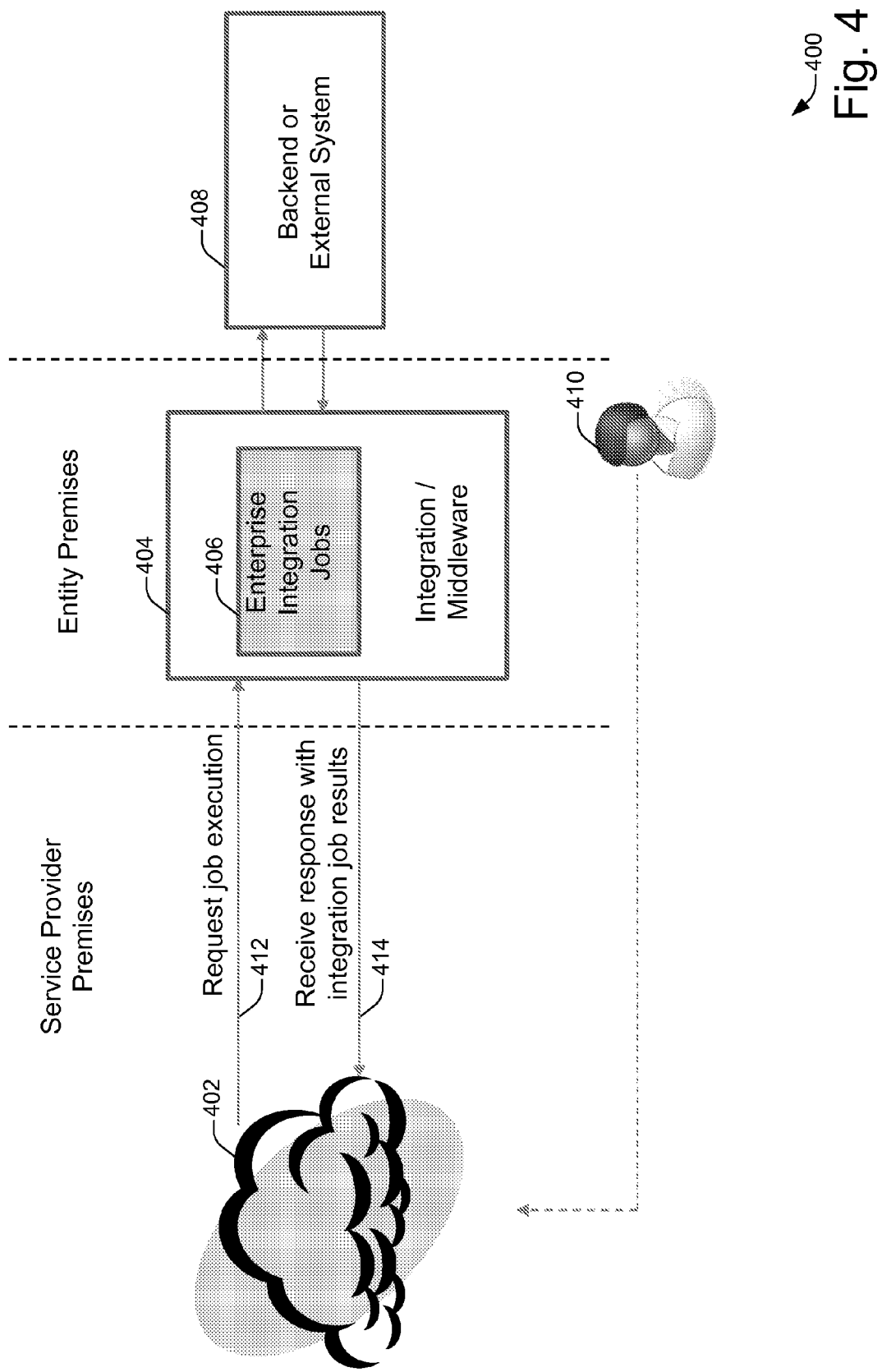
FIG. 4 shows a system diagram of a system 400 for integrating on-demand applications and enterprise integration jobs, provided in accordance with one implementation.

FIG. 4 shows a system diagram of a system 400 for integrating on-demand applications and enterprise integration jobs, provided in accordance with one implementation. The system 400 includes an on-demand computing services environment 402, an integration and middleware system 404, remote computing tasks 406, a backend or external system 408, a user 410, a request message 412, and a response message 414.

In some implementations, the elements 402-412 shown in FIG. 4 may be substantially similar to the comparable elements shown in FIGS. 2 and 3. Accordingly, FIG. 4 is described herein primarily with respect to the ways in which it differs from FIGS. 2 and 3.

In some implementations, an enterprise may employ a variety of computing systems to accomplish tasks related to its endeavors. Some of these systems, such as the on-demand computing services environment 402, may be controlled by other entities such as a service provider. Others of the systems, such as the backend or external system 408, may provide specific services such as data storage or analytics that can be accessed on demand. These services may be provided by an external entity via a network, may be custom built systems controlled by the enterprise, or may be systems purchased from an external entity but controlled by the enterprise (e.g., an Oracle Financials® system). Still others of the systems, such as the integration and middleware system 404, may provide command and control functionality for other systems employed by the entity. In some implementations, enterprise integration refers to techniques for facilitating communication, cooperation, and coordination among the various computing systems associated with an entity. Enterprise integration may include tasks such as identifying information, transferring information, updating information, coordinating business processes, and organizing and adapting the information systems.

In some implementations, a remote execution procedure may include various types of operations that are configured to be performed by various computing systems within the system 400. In one example, an entity may locate its sales procedures and data in the on-demand computing services environment 402, its payment authorization systems in its integration and middleware system 404, and its supply-chain management system in a backend or external system 408. In this example, a single sale may involve various types of communication between the different systems. For instance, a salesperson may provide sales request information to the on-demand computing services environment 402. The on-demand computing services environment 402 may send a request to authorize the sale to the integration and middleware system 404. As part of the authorization process for the sale, the integration and middleware system 404 may consult the supply-chain management system located in the backend or external system 408.

In some implementations, the user 410 may transmit a request to initiate a remote execution procedure for performing enterprise integration tasks. While performing the remote execution procedure, the on-demand computing services environment 402 may transmit one or more request messages to the integration and middleware system 404 controlled by the entity. These request messages may identify remote computing tasks to be performed at the integration and middleware system 404.

In some implementations, the integration and middleware system 404 may in turn communicate with any number of backend or external systems such as system 408. The integration and middleware system 404 may then transmit one or more response messages 404 to the on-demand computing services environment 402. These messages may indicate results of the remote computing tasks. For instance, a response message 414 to a message 412 requesting authorization for a sale may indicate whether the sale is authorized.

The system configurations shown in FIGS. 1-4 are examples of configurations that may be possible in one or more embodiments. In some implementations, the system configurations shown in FIGS. 1-4 may be combined to yield more complex system configurations. Also, other types of system configurations not shown in FIGS. 1-4 may be employed.

Figure 5:
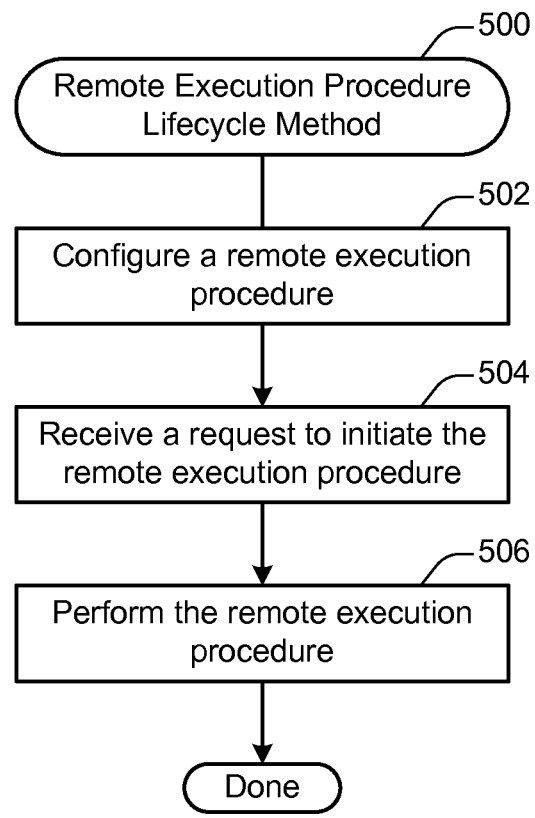
FIG. 5 shows a flowchart of a remote execution procedure lifecycle method 500, performed in accordance with one implementation.

FIG. 5 shows a flowchart of a remote execution procedure lifecycle method 500, performed in accordance with one implementation. In some implementations, the method 500 may be performed at a computing system configured to provide on-demand computing services via a network. The computing system may be in communication with a remote system via the network. The computing system may be configured to facilitate the configuring and execution of a remote execution procedure such as the procedures discussed with respect to FIGS. 1-4.

At 502, the remote execution procedure is configured. In some implementations, configuring the remote execution procedure may include receiving, identifying, or determining any information capable of being used in the performance of the remote execution procedure. For instance, configuring the remote execution procedure may include specifying information such as the computing tasks to perform, the order in which the computing tasks should be performed, control information for ordering the performing the computing tasks, identification information for remote systems, communication and authentication information for remote systems, authorization information for initiating the remote computing procedure, or any other information.

In some implementations, the remote computing procedure may be specified using a computer programming language. For instance, the remote computing procedure may be specified in a language such as the Apex® programming language available from salesforce.com of San Francisco, Calif. In this case, the configuring the remote execution procedure may include selecting or providing instructions implemented in the computer programming language.

In some implementations, the remote execution procedure may be configured at least in part by a user. For instance, a user may identify computing tasks to include in the remote execution procedure by selecting them from a list, entering them in a user interface component, or providing computer programming language instructions. As discussed with respect to FIG. 1, users affiliated with various systems may configure or initiate the remote execution procedure.

In some implementations, configuring the remote execution procedure may be performed at least in part automatically. For instance, some or all of the information for performing the remote execution procedure may be provided by a program executed within the on-demand computing services environment. In one example, a standard testing and deployment procedure may be provided for an entity accessing computing services. The standard testing and deployment procedure may perform standard operations, such as transmitting a standard request message to the entity's systems to build and test a program.

In some implementations, configuring the remote execution procedure may involve determining scheduling information for performing the remote execution procedure. For instance, the remote execution procedure may be initiated periodically, at scheduled times, or when a designated trigger event is detected.

At 504, a request to initiate the remote execution procedure is received. In some implementations, the request may be received from a user. For instance, the request may be received from the user who configured the remote execution procedure. Alternately, the request may be received from a different user. For example, the procedure may be configured by a representative of the service provider and initiated on-demand by a user associated with an entity accessing on-demand computing services.

In some implementations, the request to initiate the remote execution procedure may be generated automatically. For instance, the remote execution procedure may be initiated periodically, at scheduled times, or upon the detection of an triggering event.

In some implementations, the request to initiate the remote execution procedure may be generated at a remote computing system that performs a remote computing task in accordance with the remote execution procedure. Alternately, the request may be generated at a different location. For example, the request may be generated from within the on-demand computing services environment by a user, by a task scheduler, or by a different program. As another example, the request may be generated at a different computing device, such as a computing device associated with an entity providing computing services complementary to those provided by the service provider.

At 506, the remote execution procedure is performed. In some implementations, performing the remote execution procedure may include executing computer programming language instructions associated with the remote execution procedure configuration information. Performing the remote execution procedure may include performing computing tasks on the system at which the remote execution procedure is initiated as well as performing computing tasks on remote systems in communication with the system at which the remote execution procedure is initiated. Performing the remote execution procedure may also involve transmitting messages via a network between the system at which the remote execution procedure is initiated and other systems located remotely from that system.

Figure 6:
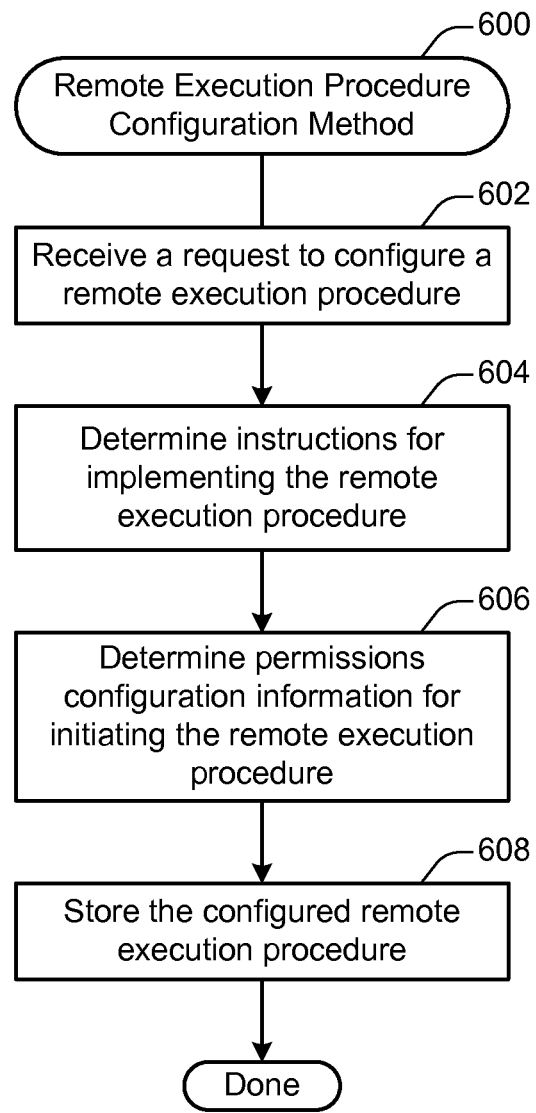
FIG. 6 shows a flowchart of a remote execution procedure configuration method 600, performed in accordance with one implementation.

FIG. 6 shows a flowchart of a remote execution procedure configuration method 600, performed in accordance with one implementation. In some implementations, the method 600 may be used to configure a remote execution procedure such as those discussed with respect to FIGS. 1-4. The remote execution procedure may be configured and initiated at an on-demand computing services environment configured to provide computing services to one or more entities via a network such as the Internet. The remote execution procedure may include at least one operation performed at a remote computing system external to the on-demand computing services environment. This remote system may be physically located in a separate location or may be a logically separate unit of the on-demand computing services environment.

In some implementations, the remote execution procedure may be configured for one of a plurality of entities accessing computing services via the on-demand computing services environment. As discussed with respect to FIGS. 8A-10, different entities may each have access to a virtual computing environment within the computing services environment. Each virtual computing environment may provide access to computing resources designated for use by the entity associated with the virtual computing environment. The entity for which the remote execution procedure is configured may be, for instance, the entity controlling the remote system 102 discussed with respect to FIG. 1. The entity may control the entity premises discussed with respect to FIGS. 2-4.

At 602, a request to configure a remote execution procedure is received. In some implementations, the request to configure the remote execution procedure may be received from a user. For example, the user may be a sales representative, account representative, or support technician associated with the service provider. As another example, the user may be a software developer, system administrator, or other individual associated with the entity for which the remote execution procedure is being configured. As yet another example, the user may be associated with a third party entity capable of accessing the on-demand computing services environment.

In some implementations, the request to configure the remote execution procedure may be generated automatically. For instance, the creation of a new continuous integration routine for an on-demand application may result in a request to automatically configure a remote execution procedure being sent to the on-demand computing services environment.

At 604, instructions for implementing the remote execution procedure are received. In some implementations, the instructions for implementing the remote execution procedure may include computer programming language instructions. The computer programming language instructions may be implemented in any of various computer programming languages, such as Apex® or Java®.

In some implementations, the instructions for implementing the remote execution procedure may include instructions for performing various types of operations. These operations may include, but are not limited to, operations for initiating the remote execution procedure, control operations (e.g., if, then, else, while, for), operations for communicating with a remote system, operations for processing messages received from a remote system, and data storage operations.

In some implementations, the instructions for implementing the remote execution procedure may be configured to perform various types of remote execution procedures. For example, the remote execution procedure may be configured to perform enterprise integration operations. As another example, the remote execution procedure may be configured to perform on-demand application development operations such as continuous integration operations, application deployment operations, and application testing operations. As yet another example, the remote execution procedure may be configured to perform testing operations such as regression testing operations, cross-system application testing operations, and remote system application testing operations. Because various types of remote execution procedures may be configured via the method 600 shown in FIG. 6, the instructions for implementing the remote execution procedure may be strategically configured by the user configuring the remote execution procedure.

At 606, permissions configuration information for initiating the remote execution procedure is determined. In some implementations, the permission configuration information may designate one or more user accounts as having permission to initiate, configure, and/or receive results from the remote execution procedure. As discussed with respect to the user 106 shown in FIG. 1, various users may initiate a remote execution procedure. These users may include, but are not limited to, users associated with the on-demand service provider, users associated with an entity accessing the on-demand computing services environment, or users associated with a third party entity.

In some implementations, the permissions configuration information may be determined at least in part automatically. For example, the entity for which the remote execution procedure is configured may have associated therewith one or more user accounts designated as having permission to initiate remote execution procedures. As another example, the user configuring the remote execution procedure may automatically be provided with permission to initiate the remote execution procedure.

In some implementations, the permissions configuration information may identify one or more environment variables that must be satisfied in order to execute the remote execution procedure. For example, the permissions configuration information may indicate that an application deployment procedure may only be initiated between certain hours in order to reduce the negative impact of errors. As another example, the permissions configuration information may indicate that an application deployment procedure may be initiated only if an application testing procedure is first initiated and produces a positive result.

In some implementations, the permissions configuration information may be determined at least in part based on information received from the user configuring the remote execution procedure. For instance, the user may indicate one or more user accounts to designate as having permission to initiate the remote execution procedure.

At 608, the configured remote execution procedure is stored. In some implementations, the configured remote execution procedure may be stored in a manner such that it may be initiated on demand in response to a request received via a network such as the Internet. For instance, the configured remote execution procedure may be stored on a storage medium accessible via systems associated with the on-demand computing services environment. The configured remote execution procedure may then be made available for initiation based on a request received via the Internet, such as a RESTful HTTP request transmitted to a server configured to provide web services.

Figure 7:
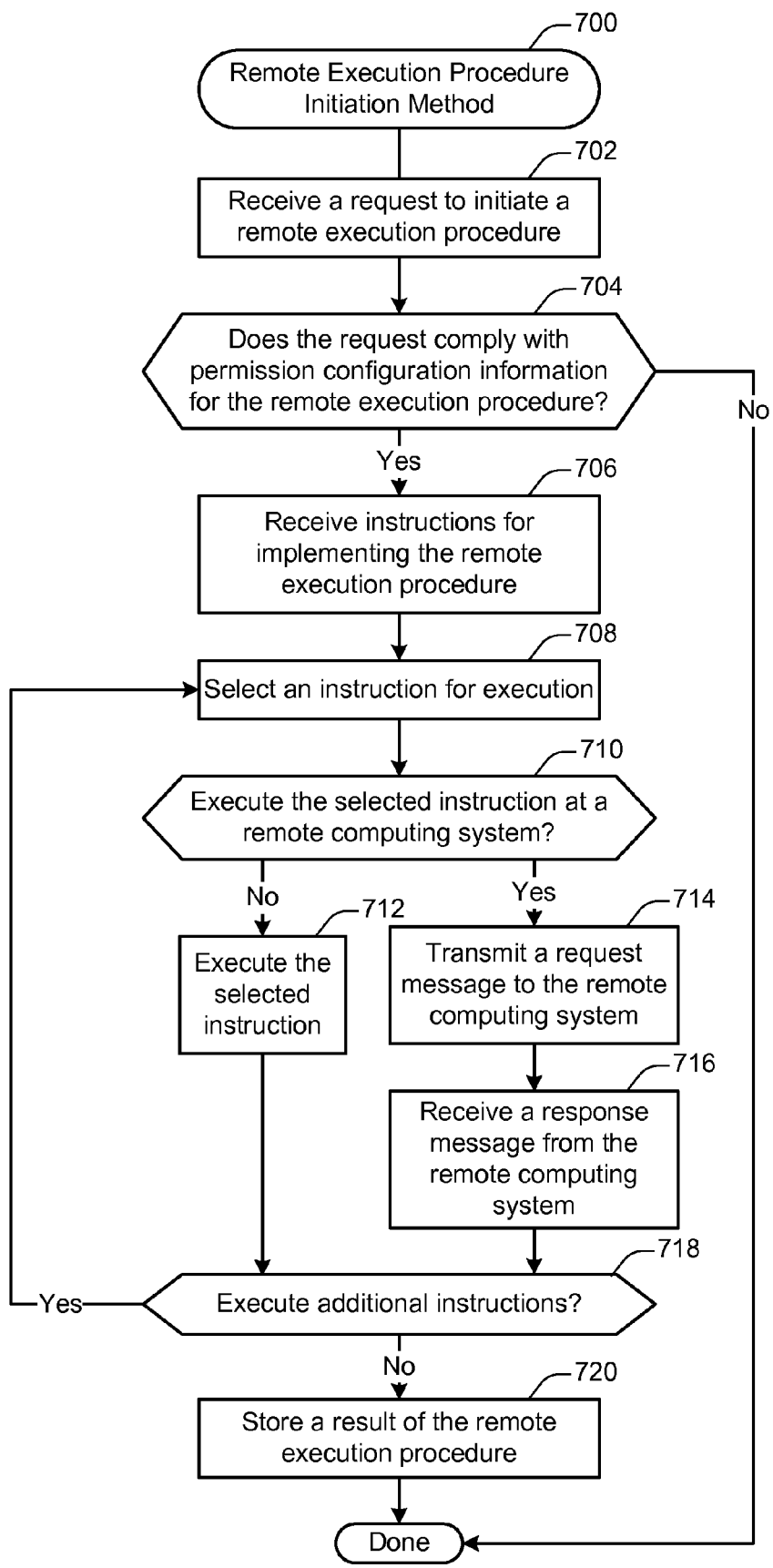
FIG. 7 shows a flowchart of a remote execution procedure initiation method 700, performed in accordance with one implementation.

FIG. 7 shows a flowchart of a remote execution procedure initiation method 700, performed in accordance with one implementation. In some implementations, the method 700 shown in FIG. 7 may be employed to perform a remote execution procedure configured in accordance with the method 600 discussed with respect to FIG. 6. As discussed with respect to FIGS. 1-5, the remote execution procedure may be configured to perform various types of computing tasks such as software application deployment operations, software application testing operations, and enterprise integration operations. The operations performed by any given remote execution procedure may be strategically determined by the creator of the remote execution procedure, as discussed with respect to FIG. 6.

At 702, a request to initiate a remote execution procedure is received. In some implementations, as discussed with respect to FIGS. 1-4, the request may be received from a user associated with any one of various entities capable of communicating with the on-demand computing services environment. Alternately, the request may be generated automatically. For instance, a remote execution procedure may be scheduled for initiation at designated times or when designated trigger events are detected.

At 704, a determination is made as to whether the request complies with permission configuration information for the remote execution procedure. In some implementations, the permission configuration information analyzed at operation 704 may include the information determined at operation 606 shown in FIG. 6. As discussed with respect to FIG. 6, this information may identify a user permitted to initiate the remote execution procedure, one or more environment variables restricting the initiation of the remote execution procedure, or any other relevant permissions information.

At 706, instructions for implementing the remote execution procedure are received. In some implementations, the instructions received at operation 706 may include the instructions identified during the configuration of the remote execution procedure at operation 604. As discussed with respect to operation 604, these instructions may be implemented in one or more computer programming languages and may indicate a variety of different operations to perform. These operations may be designed for performance at the on-demand computing services environment or at one or more remote computing systems.

At 708, an instruction is selected for execution. In some implementations, instructions may be selected in accordance with a designated sequence. The instructions may be implemented in a computer programming language supported by the on-demand computing services environment. In many programming languages, instructions are executed in a top-to-bottom sequence based on their ordering within a file. Sequential execution of instructions may be subject to control instructions such as "if," "else," "for," "while," "switch", and function calls. Thus, the selection of the instruction for execution may be performed by selecting the next instruction in a sequence of instruction, subject to any control sequences altering the normal sequence of instructions.

At 710, a determination is made as to whether to execute the selected instruction at a remote computing system. In some implementations, the determination made at 710 may be made at least in part based on an indication designated within the instructions for implementing remote execution procedure. For example, a particular instruction may be designated as a remote instruction that should be performed on the remote computing system. As another example, a particular instruction may indicate that a request message should be sent to a remote computing system to perform a remote computing task.

At 712, the selected instruction is executed. In some implementations, execution of the selected instruction may include performing a computer programming language instruction implemented in a computer programming language such as Java or Apex. The computer programming language may be compiled, interpreted, or some combination thereof. The instruction may include any computer programming language instruction supported by the system, such as a control sequence instruction, a data read or write instruction, a calculation instruction, an input or output instruction, or an object-related instruction.

At 714, a request message is transmitted to the remote computing system. In some implementations, the request message transmitted at 714 may be substantially similar to the request messages discussed with respect to FIGS. 1-4.

In some implementations, the creation of a request message may be specified explicitly within the instructions for implementing the remote execution procedure. Alternately, or additionally, the creation of a request message may be performed automatically when an instruction selected for execution has been designated for performance at a remote computing system.

In some implementations, the on-demand computing services environment may be in communication with more than one remote system. In this case, a determination or selection may be made to indicate to which of the plurality of remote computing systems the request message should be sent.

In some implementations, the request message may indicate one or more operations to be performed at the remote computing system. The request message may be include in terms of computer programming language instructions to execute. Alternately, or additionally, the request message may indicate one or more web services to activate at the remote computing system. These web services may be provided in accordance with a REST framework in which the services may be initiated in response to a request received via a network such as the Internet.

In some implementations, the request message may indicate data, such as data to be operated upon by the remote computing task or tasks requested by the request message. In some cases, the data may be included in the request message. In some cases, the data may be stored at a location accessible to the remote computing system and may be indicated in the request message.

In some implementations, the request message may conform to a designated format. For instance, the request message may be formulated in accordance with an XML or JSON based structure. In this way, the remote computing system may be made capable of parsing the request message to identify one or more remote computing tasks to execute, data to be used in the execution of the remote computing tasks, or any other relevant information included in the request message.

At 716, a response message is received from the remote computing system. In some implementations, the response message received at 716 may be substantially similar to the response message discussed with respect to FIGS. 1-4. For instance, as discussed with respect to FIGS. 1-4 and operation 714, the response message may be implemented in a designated format such as JSON or XML.

In some implementations, the response message may include various types of information. For example, the response message may include an acknowledgement of receipt of the request message. As another example, the response message may include an indication that the requested computing task or tasks have been performed. As yet another example, the response message may include or indicate data resulting from the performance of the requested computing task or tasks. As still another example, the response message may indicate one or more computing tasks to be performed at the on-demand computing services environment.

In some implementations, the execution of the remote execution procedure at the on-demand computing services environment may halt while the system waits for a response message from the remote system. Alternately, all or portions of the remote execution procedure may continue to be performed while the system waits for a response message. In some cases, a response message may not be transmitted.

At 718, a determination is made as to whether to execute additional instructions. In some implementations, as discussed with respect to operation 708, instructions may be executed sequentially. Execution of instructions may be subject to control sequences, such as "if," "else," "while," and "for." If the most recently executed instruction is the last instruction in a sequence of instructions, then additional instructions may not be selected for execution. If instead additional instructions follow the most recently executed instruction, then the next instruction may be selected for execution at operation 708.

At 1720, a result of the remote execution procedure is stored. In some implementations, the result of the remote execution procedure may include any information received from the remote computing system or determined within the local computing environment at the service provider. The types of information that may be included in the result may include, but are not limited to, test results, software deployment attempt results, test data, and application integration data.

In some implementations, the result of the remote execution procedure may be stored on a storage medium accessible via the on-demand computing services environment. The result may then be accessed by a user associated with the service provider, the entity, or a third party. The result may be made available in a dashboard, spreadsheet, webpage, XML document, text file, or any other appropriate presentation medium.

In some implementations, the result of the remote execution procedure may be transmitted to a user via a network such as a local area network (LAN) or the Internet. In one example, the user to which the result is transmitted may be the user who initiated the remote execution procedure. In another example, the user to which the result is transmitted may be a user for which the result may be of interest, such as a system administrator responsible for a system affected by the remote execution procedure or a software developer developing software tested by the remote execution procedure.

In some implementations, the result of the remote execution procedure may be used to initiate other operations within the on-demand computing services environment. The on-demand computing environment may be equipped with a workflow system capable of initiating various types of computing tasks in response to the completion of other computing tasks in accordance with a designated workflow procedure. For instance, if a preliminary test procedure for an on-demand computing application returns a successful result, then a separate procedure may be initiated to deploy the on-demand computing application.

Figure 8A:
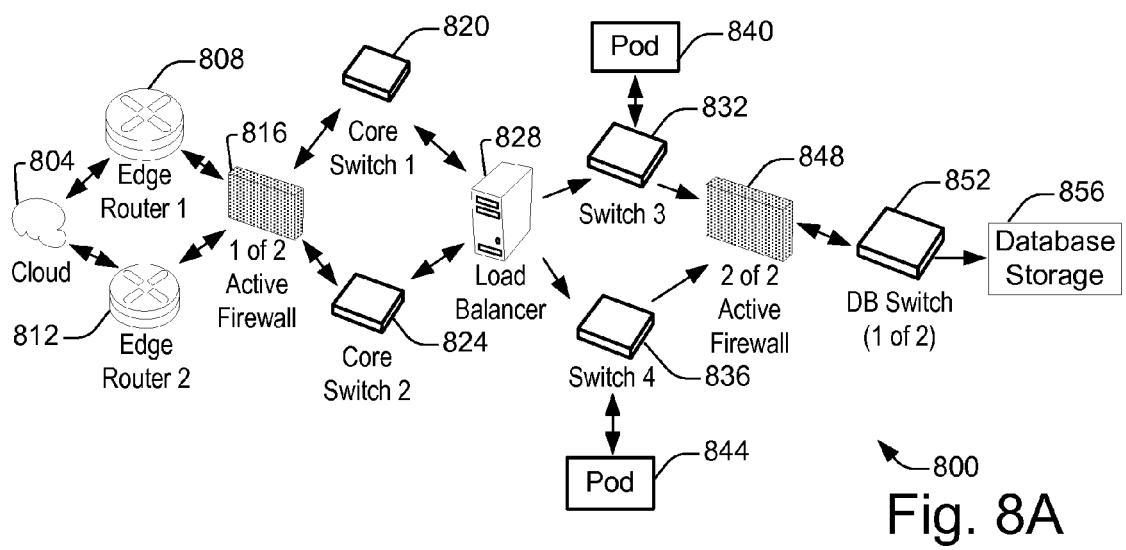
FIG. 8A shows a system diagram 800 illustrating architectural components of an on-demand service environment, in accordance with one implementation.

FIG. 8A shows a system diagram 800 illustrating architectural components of an on-demand service environment, in accordance with one implementation.

A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
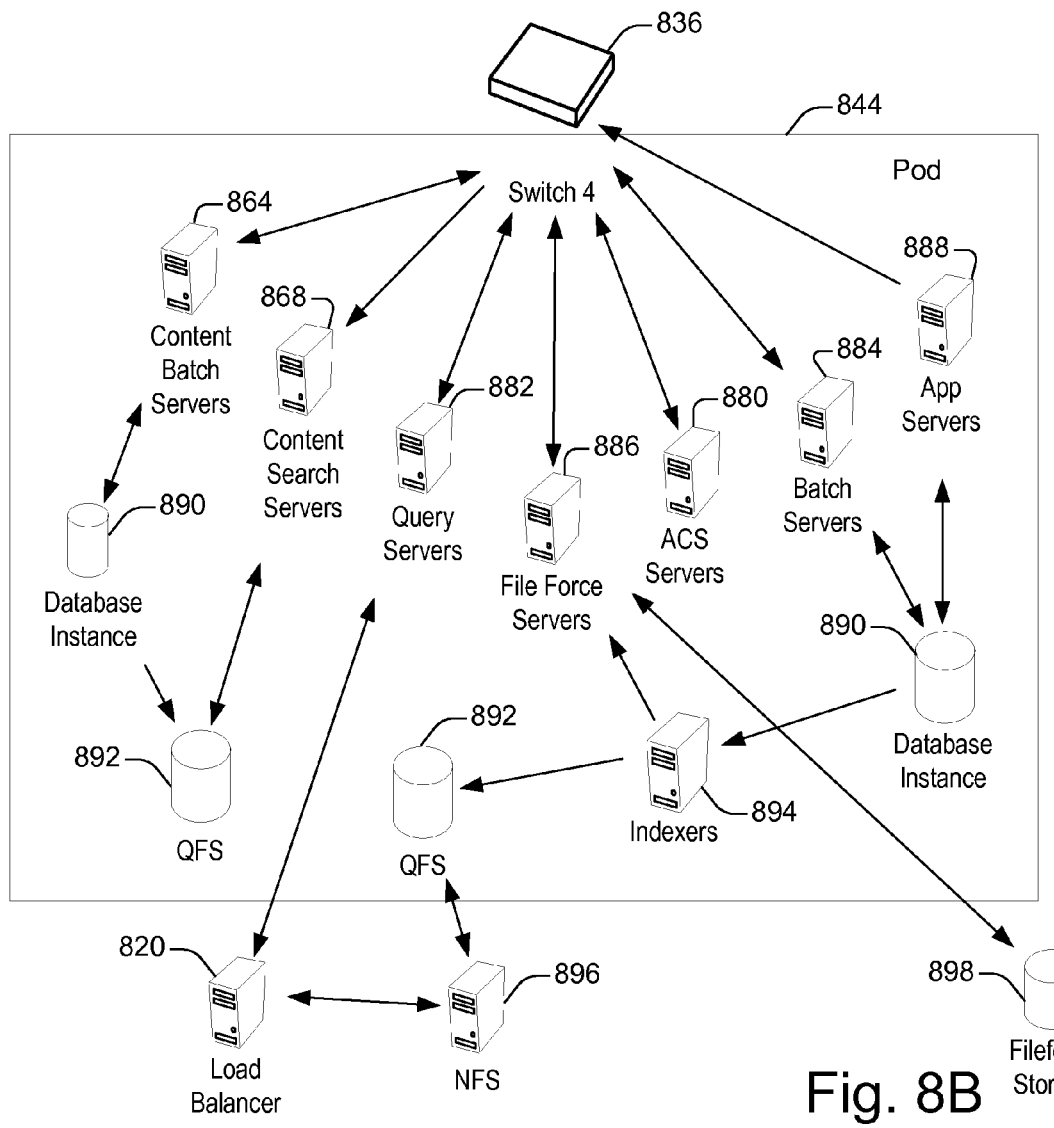
FIG. 8B shows a system diagram further illustrating architectural components of an on-demand service environment, in accordance with one implementation.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some implementations of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some implementations, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more implementations, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the on-demand service environment 800. The core switches 820 and 824 may be configured as network bridges that quickly route data between different components within the on-demand service environment. In some implementations, the use of two or more core switches 820 and 824 may provide redundancy and/or reduced latency.

In some implementations, the pods 840 and 844 may perform the core data processing and service functions provided by the on-demand service environment. Each pod may include various types of hardware and/or software computing resources. An example of the pod architecture is discussed in greater detail with reference to FIG. 8B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856.

In some implementations, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one implementation. The pod 844 may be used to render services to a user of the on-demand service environment 800.

In some implementations, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein.

The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment.

The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod.

The pod 844 may share a database instance 890 configured as a multi-tenant environment in which different organizations share access to the same database. Additionally, services rendered by the pod 844 may require various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs.

In some implementations, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some implementations, one or more query servers 872 may communicate with the NFS 896 to retrieve and/or update information stored outside of the pod 844. The NFS 896 may allow servers located in the pod 844 to access information to access files over a network in a manner similar to how local storage is accessed.

In some implementations, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS, it may be available for use by servers within the pod 844 without requiring an additional database call.

In some implementations, database information may be transmitted to the indexer 894. Indexer 894 may provide an index of information available in the database 890 and/or QFS 892. The index information may be provided to file force servers 876 and/or the QFS 892.

Figure 9:
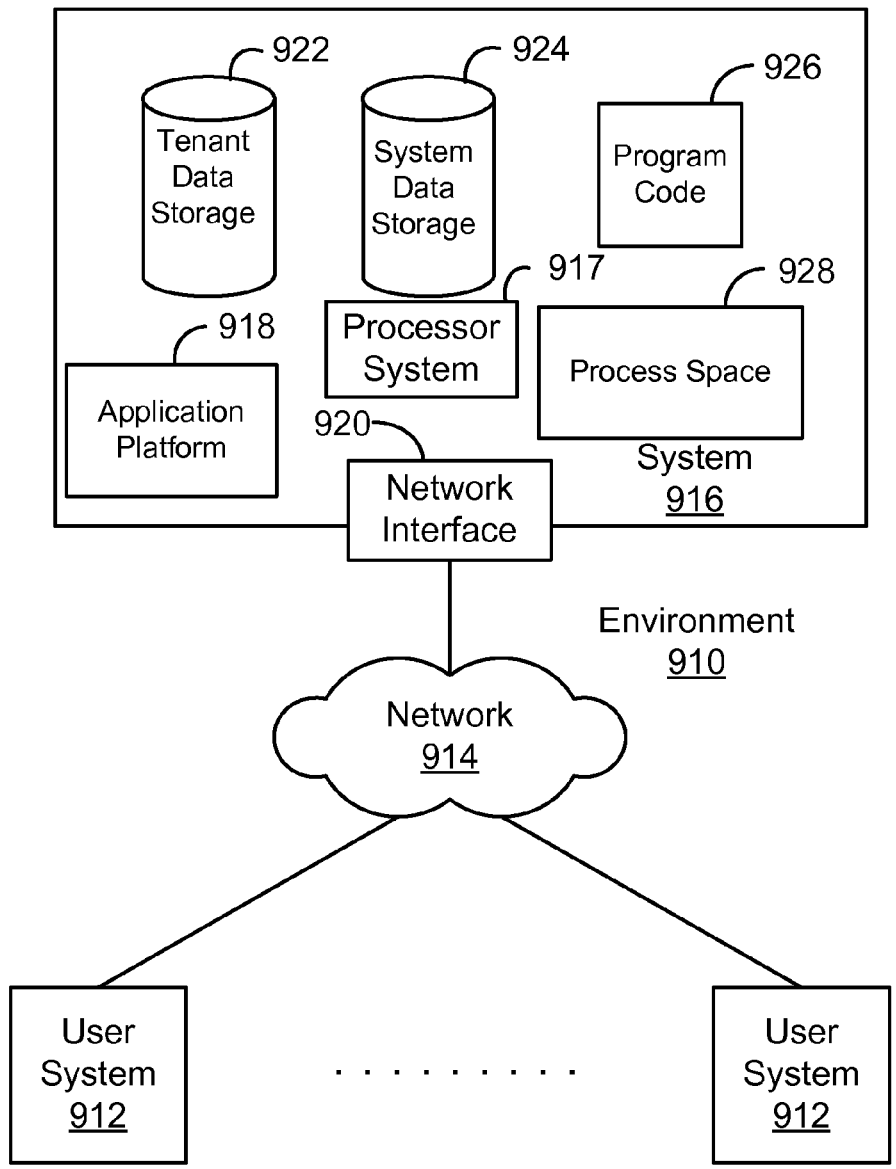
FIG. 9 shows a system diagram 910 illustrating the architecture of a multitenant database environment, in accordance with one implementation.

FIG. 9 shows a block diagram of an environment 910 wherein an on-demand database service might be used, in accordance with one implementation.

Figure 10:
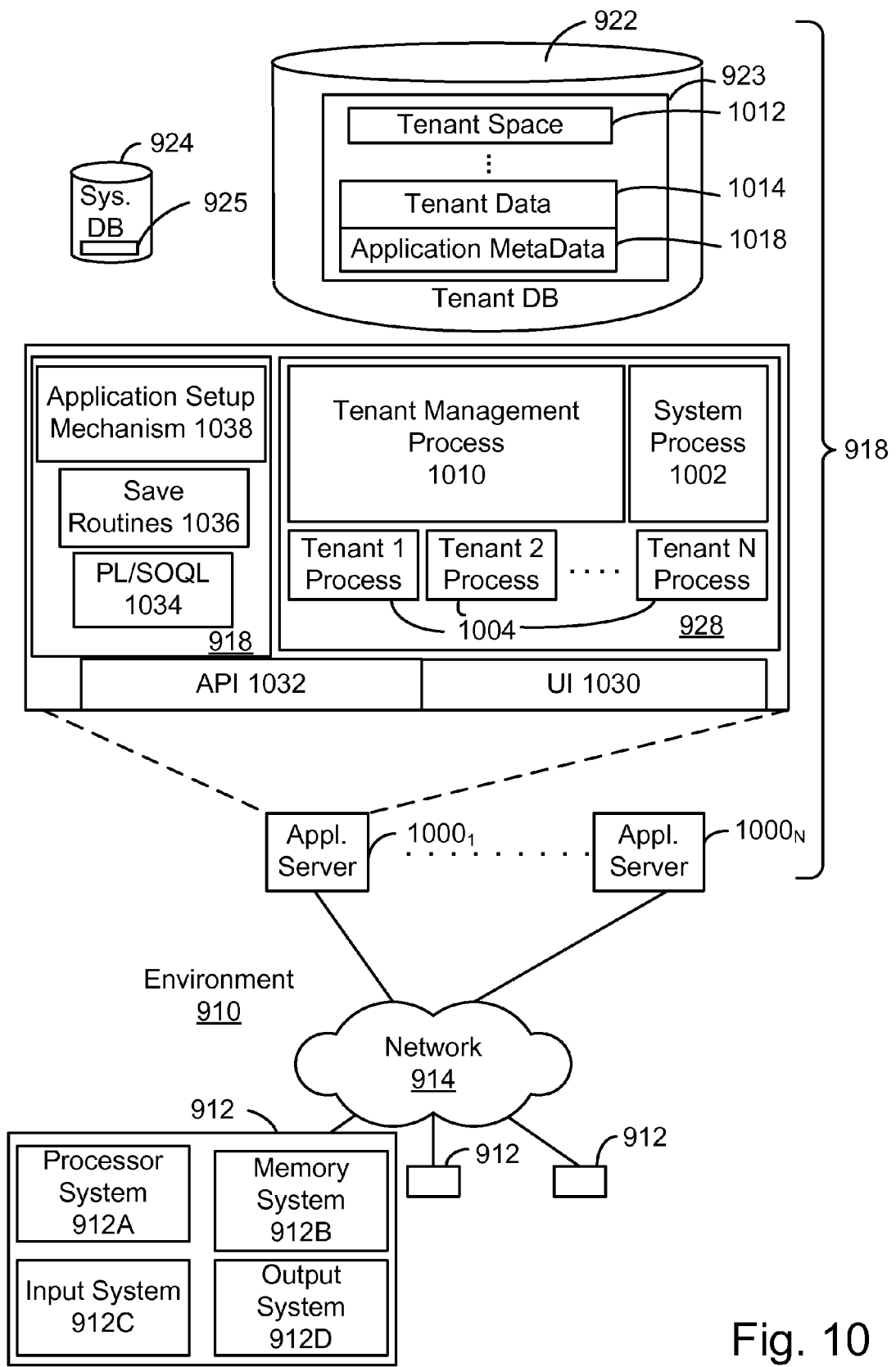
FIG. 10 shows a system diagram 910 further illustrating the architecture of a multitenant database environment, in accordance with one implementation.

Environment 910 includes an on-demand database service 916. User system 912 may be any machine or system that is used by a user to access a database user system. For example, any of user systems 912 can be a handheld computing device, a mobile phone, a laptop computer, a work station, and/or a network of computing devices. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one implementation, system 916, shown in FIG. 9, implements a web-based customer relationship management (CRM) system. For example, in one implementation, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one implementation, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing implementations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one implementation, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with one implementation. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other implementations, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine. Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain implementations, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one implementation, therefore, an interface system implementing a load balancing function (e.g., an F5 Big-IP load balancer) is communicably coupled between the application servers 1000 and the user systems 912 to distribute requests to the application servers 1000. In one implementation, the load balancer uses a least connections algorithm to route user requests to the application servers 1000. Other examples of load balancing algorithms, such as round robin and observed response time, also can be used. For example, in certain implementations, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain implementations, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method comprising:
receiving at a first computing system a request to initiate a remote execution procedure, the first computing system being controlled by a first entity, the first computing system configured to provide on-demand computing services to a plurality of entities including a second entity, the remote execution procedure including an instruction to perform a remote computing task capable of being performed by a second computing system;
transmitting a request message from the first computing system to the second computing system, the second computing system being controlled by the second entity, the request message including an instruction to perform the remote computing task;
receiving a response message from the second computing system, the response message indicating a result of performing the remote computing task; and
determining whether the request to initiate the remote execution procedure complies with permissions configuration information associated with the remote execution procedure.

2. The method recited in claim 1, wherein the remote execution procedure is configured to access data accessible via the first computing system, and wherein the remote computing task is configured to access data accessible via the second computing system.

3. The method recited in claim 1, wherein the remote execution procedure comprises a plurality of instructions implemented in a computing programming language, the plurality of instructions including the instruction to perform the remote computing task.

4. The method recited in claim 1, wherein the remote execution procedure comprises a local computing task capable of being performed by the first computing system.

5. The method recited in claim 1, wherein the remote execution procedure is configured to deploy software located at the second computing system to the first computing system.

6. The method recited in claim 5, wherein performing the remote computing task comprises:
transmitting at least a portion of the software from the second computing system to the first computing system.

7. The method recited in claim 1, wherein the remote execution procedure is configured to test an interaction between the second computing system and the on-demand computing services provided by the first computing system.

8. The method recited in claim 1, wherein the request to initiate the remote execution procedure is received from a computing device associated with the second entity.

9. The method recited in claim 1, wherein the remote execution procedure is defined in accordance with instructions received from the second entity.

10. The method recited in claim 1, wherein the remote execution procedure includes an instruction operating on data stored in a multi-tenant database accessible via a network, and wherein the on-demand computing services include access to the multi-tenant database.

11. A system comprising:
one or more computing devices configured to:
receive at a first computing system a request to initiate a remote execution procedure, the first computing system being controlled by a first entity, the first computing system configured to provide on-demand computing services to a plurality of entities including a second entity, the remote execution procedure including an instruction to perform a remote computing task capable of being performed by a second computing system;
transmit a request message from the first computing system to the second computing system, the second computing system being controlled by the second entity, the request message including an instruction to perform the remote computing task;
receive a response message from the second computing system, the response message indicating a result of performing the remote computing task; and
determine whether the request to initiate the remote execution procedure complies with permissions configuration information associated with the remote execution procedure.

12. The system recited in claim 11, wherein the remote execution procedure is configured to access data accessible via the first computing system, and wherein the remote computing task is configured to access data accessible via the second computing system.

13. The system recited in claim 11, wherein the remote execution procedure comprises a plurality of instructions implemented in a computing programming language, the plurality of instructions including the instruction to perform the remote computing task.

14. The system recited in claim 11, wherein the remote execution procedure comprises a local computing task capable of being performed by the first computing system.

15. The system recited in claim 11, wherein the remote execution procedure is configured to deploy software located at the second computing system to the first computing system.

16. The system recited in claim 15, wherein performing the remote computing task comprises:
transmitting at least a portion of the software from the second computing system to the first computing system.

17. The system recited in claim 11, wherein the remote execution procedure is configured to test an interaction between the second computing system and the on-demand computing services provided by the first computing system.

18. One or more non-transitory computer readable media that stores computer programming language instructions configured to be executed to cause:
receiving at a first computing system a request to initiate a remote execution procedure, the first computing system being controlled by a first entity, the first computing system configured to provide on-demand computing services to a plurality of entities including a second entity, the remote execution procedure including an instruction to perform a remote computing task capable of being performed by a second computing system;
transmitting a request message from the first computing system to the second computing system, the second computing system being controlled by the second entity, the request message including an instruction to perform the remote computing task;
receiving a response message from the second computing system, the response message indicating a result of performing the remote computing task; and
determining whether the request to initiate the remote execution procedure complies with permissions configuration information associated with the remote execution procedure.

19. The one or more non-transitory computer readable media of claim 18, wherein the remote execution procedure is configured to access data accessible via the first computing system, and wherein the remote computing task is configured to access data accessible via the second computing system.

20. The one or more non-transitory computer readable media of claim 18, wherein the remote execution procedure comprises a plurality of instructions implemented in a computing programming language, the plurality of instructions including the instruction to perform the remote computing task.

21. The one or more non-transitory computer readable media of claim 18, wherein the remote execution procedure comprises a local computing task capable of being performed by the first computing system.

22. The one or more non-transitory computer readable media of claim 18, wherein the remote execution procedure is configured to deploy software located at the second computing system to the first computing system.

23. The one or more non-transitory computer readable media of claim 22, wherein performing the remote computing task comprises:
transmitting at least a portion of the software from the second computing system to the first computing system.

24. The method recited in claim 1, wherein the first entity is a service provider.

25. The one or more non-transitory computer readable media of claim 18, wherein the first entity is a service provider.

26. The method recited in claim 1, wherein the on-demand computing services are provided to the second entity through the second computing system.

27. The one or more non-transitory computer readable media of claim 18, wherein the on-demand computing services are provided to the second entity through the second computing system.

* * * * *